Figure 1A:
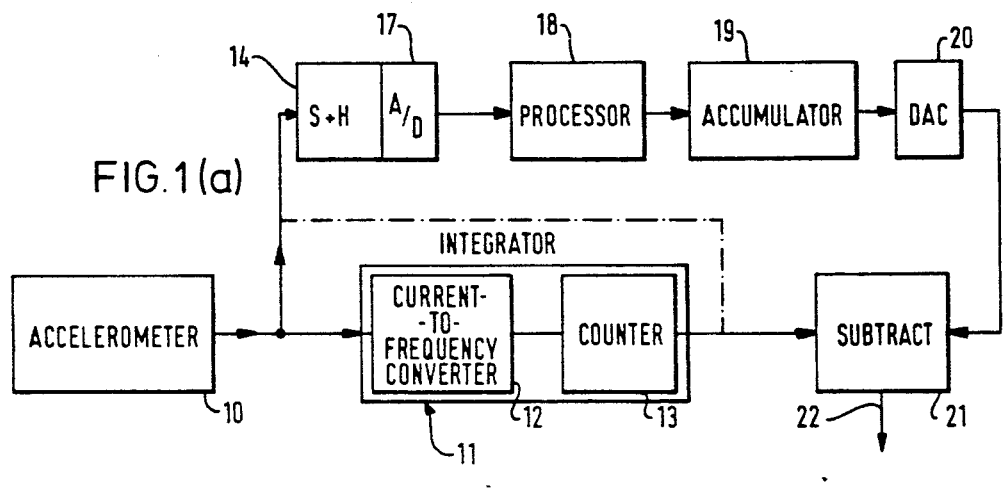

United States Patent [19]

Watson

[11] Patent Number: 5,146,417
[45] Date of Patent: Sep. 8, 1992

[54] SIGNAL PROCESSING APPARATUS AND METHOD

[75] Inventor: Norman F. Watson, Edinburgh, Scotland

[73] Assignee: Gec-Ferranti Defence Systems Limited, Middlesex, United Kingdom

[21] Appl. No.: 489,708

[22] Filed: Mar. 7, 1990

[30] Foreign Application Priority Data

Mar. 22, 1989 [GB] United Kingdom ............... 8906609

[51] Int. Cl.$^5$ ........................................... G01P 21/00
[52] U.S. Cl. .............................. 364/571.01; 364/566; 341/120
[58] Field of Search .................. 364/565, 566, 571.01, 364/571.02, 571.05; 341/122, 123; 73/517 R; 324/160, 166

[56] References Cited

U.S. PATENT DOCUMENTS

| | | | |
|---|---|---|---|
| 4,656,598 | 4/1987 | Wilson | 341/122 X |
| 4,704,600 | 11/1987 | Uchimura et al. | 341/122 |
| 4,768,017 | 8/1988 | Gordon | 341/122 |
| 4,903,021 | 2/1990 | Leibholz | 364/179 X |
| 4,908,622 | 3/1990 | Turai | 341/122 |
| 5,014,228 | 5/1991 | Lau | 364/571.01 |

Primary Examiner—Joseph L. Dixon
Attorney, Agent, or Firm—Kerkam, Stowell, Kondracki & Clarke

[57] ABSTRACT

A method for correcting an integral signal representing the integral of an input signal derived from an accelerometer to eliminate the effects of errors in the input signal comprises sampling one or more signals which bear a functional relationship with the errors and subjecting the samples to a correction algorithmic process. The processed results are integrated and used to correct the input signal integral. Relatively few samples may be taken at below the Nyquist rate at random or pseudo-random intervals to provide an acceptable quantitive estimate of the error in the integrated input signal.

The samples are spaced throughout the integration period by defining window intervals and taking one or more samples randomly in each window interval. Apparatus to practice the method include an integrator for integrating the input signal and a sample and hold circuit for sampling the input signal. Sample signals are subjected to the correction algorithmic process under the control of a control circuit arranged to provide output control signals that define sampling intervals at a high frequency rate, sampling window intervals and the integration time. An accumulator receives and stores processed samples with the output of the accumulator applied to a correction circuit to correct errors in the input signal which after integration is also applied to the correction circuit, the output of the correction circuit representing the corrected signal.

14 Claims, 3 Drawing Sheets

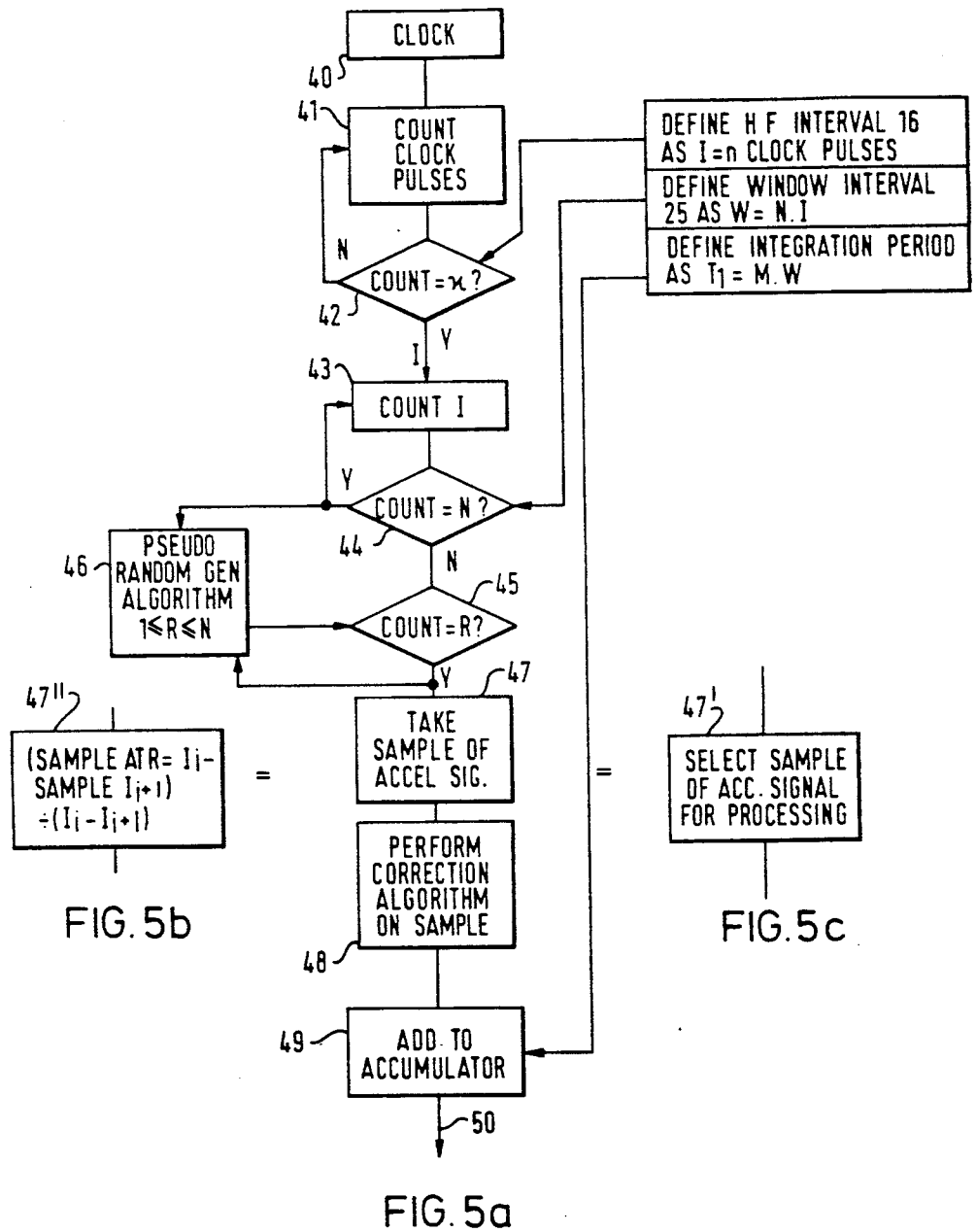

SIGNAL PROCESSING APPARATUS AND METHOD

This invention relates to signal processing and in particular to processing that involves integration with respect to time of an input signal containing components which in the integrated form give an erroneous result and wherein it is usual to remove the effects of the components (that may be detectable in the input signal or not) from the integrated signal rather than the input signal.

The invention is particularly, but not exclusively, applicable to the processing of signals provided by accelerometers used for inertial measurement, both in relation to the inherent response linearity to measuring acceleration along an axis to which an accelerometer is sensitive and in relation to the effects of motions of the accelerometer along or about nominally non-sensitive axes that manifest themselves in the signal produced.

Accelerometers used in inertial measurement are most frequently employed in navigation instruments wherein the acceleration signals are integrated with respect to time to give a measure of the velocity of a vehicle and possibly further integrated to give a measure of distance travelled. Clearly there is an important need to remove inaccuracies which if carried through processing and accumulated would both render the instruments insufficiently accurate for navigation. Accordingly, the sources of error and their elimination have been studied mathematically and practically and although forming no part of the present invention per se, examples of such errors will be outlined here for the purposes of explaining the present invention.

Correction errors in accelerometers and other inertial navigation instruments in general is discussed in the text books, for instance by N. Fernandez and G. R. Macomber in "Inertial Guidance Engineering" published by Prentice-Hall Inc., Englewood Cliffs, N.J., U.S.A.

One form of accelerometer error is a transfer function linearity error, often referred to as scale factor non-linearity, in which an output signal, say in the form of a current, is not proportional to the input, acceleration, alone but is in the form of a polynomial in which there is a constant term being a function of the instrument, what is herein referred to as a first order term proportional to acceleration and what is herein referred to as a second order term proportional to the square of acceleration.

This may be summarised as, output signal =

$$ACC. = K_0 + K_1[\text{acceleration}] + K_2[\text{acceleration}]^2 \quad (1),$$

where $K_0$, $K_1$ and $K_2$ are determinable constants for a particular instrument and operating conditions and higher order terms are ignored.

In the operating environment such accelerometer may be called upon to measure very low levels of inertial acceleration whilst subject to a vibration within the craft due to the craft motion or a deliberately induced dither of an instrument cluster carrying the accelerometer. The effect of such vibration is to provide a composite inertial and vibrational acceleration that is represented by the output signal of the accelerometer.

If the vibrational motion is sinusoidal, say represented by the function $a\sin wt$, the output signal given by equation (1) can be represented as $$ACC. = K_0 + K_1 a\sin wt + K_2 a^2 \sin^2 wt \quad (2)$$

which may be expressed as $$ACC. = K_0 + K_1 \sin wt + \tfrac{1}{2} K_2 a^2 - \tfrac{1}{2} K_2 a^2 \cos 2wt \quad (3)$$

Although integration over a substantial interval can be made to have a filtering effect on the periodic variations it will be seen that the second order term in the transfer function introduces to equation (3) a constant term $\tfrac{1}{2} K_2 a^2$.

The coefficient $K_2$ is usually much smaller than $K_1$, and the term ($\tfrac{1}{2} K_2 a^2$) would only become significant in the acceleration signal per se for large peak values (a) of vibrational acceleration, but its effect when signal ACC. is integrated with respect to time to give a velocity signal VEL. is certainly significant for long integration times in giving an erroneous time dependent component to the velocity signal.

In order to obtain a velocity measurement from an accelerometer it is known to perform integration of the measured acceleration-representing signal where it takes the form of a current by means of a current-to-frequency converter in which a capacitor is charged by the current until the voltage developed thereon reaches a threshold at which time the capacitor is reset by inserting a predetermined opposite charge that offsets the voltage and permits further charging, the number of capacitor resets in any given time period representing the average current flow in that time period and the total number of resets counted over a longer integration period representing the integral of that current flow, nominally the velocity of the craft.

Such a method of integration is considered very accurate per se and involves no direct measurement of acceleration current but, because of the aforementioned non-linearity given by the second order transfer function term, the velocity-representing signal, that is, the integrated input signal, or integral signal, does have to be corrected to give a true value.

This may be effected by sampling the velocity value throughout the integration period at high rate to give for each pair of adjacent sample values an average current sample value and for each effective current sample applying an algorithmic process that isolates the second order term, essentially by squaring the sample, multiplying it by a factor that provides the second order coefficient and sample duration and accumulating the processed samples for the integration period to get a quantitive estimate of the effect of the second order terms on the integrated accelerometer signal and subtracting this estimate to derive a true integral based upon first order term only.

It will be seen that a similar procedure involving sampling the accelerometer signal rather than its integral gives acceleration samples directly for the algorithmic process.

In either case it will be appreciated that in order to derive adequate information for processing a signal oscillating in amplitude whilst avoiding aliasing effects it is usually considered necessary to sample at, or preferably well above, the rate of twice the maximum oscillation frequency of interest present given by the Nyquist sampling theorem, and in practice it has been perceived necessary to sample at five or six times the oscillation frequency, that is, about $3 \times$ 'Nyquist rate'.

It will be understood that in modern systems such algorithmic processing of signals is accomplished in digital form by programmed computer which also performs many other functions including control of sampling and that the taking and processing of samples at a high rate, which may in practice be of the order of 2.5 KHz, is a burden upon the system which is primarily interested in low frequency inertial change of signals and wasteful of computer overheads just to eliminate the effects of the unwanted second order output due to high frequency vibrations.

A second form of error occuring in accelerometers is the so-called vibropendulosity error which results from vibrational motion about the sensitive axis and orthogonal to it and is a function of the product of the acceleration experienced in these directions.

A third form of error that occurs in accelerometers is the so-called sculling error in which vibrations along rectilinear axes mutually orthogonal to the sensitive axis have an effect along the sensitive axis that puts the accelerometer output signal in error. When the accelerometer is mounted in a strap-down inertial platform with similar accelerometers sensitive along mutually orthogonal directions and gyros measuring rotation about those axis it is usual to the signals from the appropriate devices that measure in a particular angular or rectilinear sense to be sampled and used to perform a correction algorithm on the signal of the one accelerometer.

Although in these cases the errors are not detectable from the accelerometer signal itself their effects on the integrated signal are quantifiable by sampling the signals of devices that do measure in the appropriate directions subjecting the signal samples to the algorithmic function that defines their effect on the accelerometer sensitive axis and then integrating them before correcting the integrated accelerometer signal.

The correction procedure, insofar as it comprises sampling one or more signals, subjecting the samples to a correction algorithmic process then integrating the processed samples to give a correction for the integrated accelerometer signal, will be seen to conform in pattern to the first mentioned case and all of the above description exemplify the practice of extracting information at relatively high frequency from an oscillating signal in order to correct an output formed by integration of that oscillating signal.

It is an object of the present invention to provide a method of, and apparatus for, correcting an integrated input signal for the effects of errors in the input signal by deriving samples of the input or integrated signal and processing the samples which provides simplification of, and savings in effecting, said sampling and processing than hitherto.

According to a first aspect of the present invention apparatus for processing an input signal by integration with respect to time thereof for an integration period and correcting errors in the integrated signal due to errors in the input signal comprises signal sampling and processing means responsive to control signals to derive signal samples which bear a functional relationship with the errors in the input signal, subject to the samples to an algorithmic process representative of said functional relationship to quantify the error in the input signal represented by the samples and integrate the processed sample results to quantify the effects on the integrated signal, further processing means operable to modify the integrated signal in accordance with the quantified effect and control means operable to define the integration period and produce a plurality of control signals for the sampling and processing means at randomly or pseudorandomly generated times such that the number of control signals generated is smaller than required by the Nyquist sampling theorem for the highest signal frequency of interest.

According to a second aspect of the present invention a method of correcting a signal, representing the integral for a predetermined integration period of an input signal, of errors due to errors in the input signal comprises deriving from one or more signals that bear a functional relationship with the errors samples at randomly or pseudorandomly related times such that the number of samples in the integration period is smaller than required by the Nyquist sampling rate, subjecting the samples to an algorithmic process representing said functional relationship, integrating the processed sample results to quantify their effects on the integral signal and modifying the said integral signal in accordance with the quantified effects.

Figure 1B:
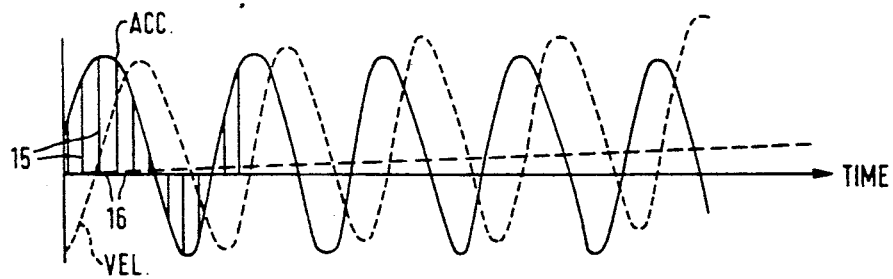
Figure 1C:
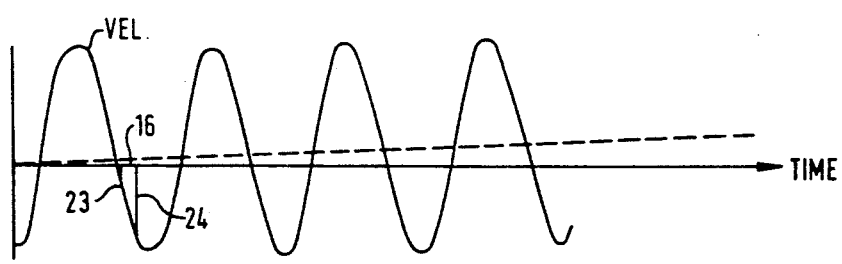
Figure 2:
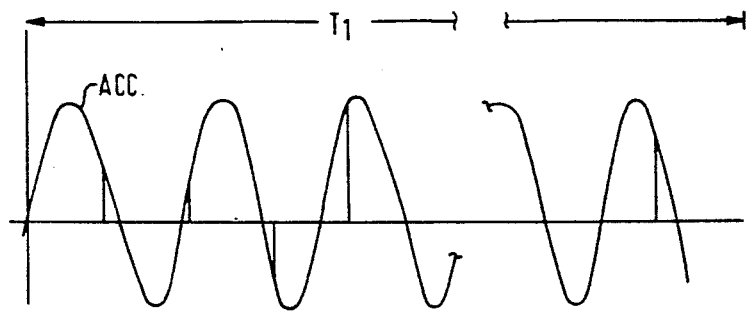
Figure 3:
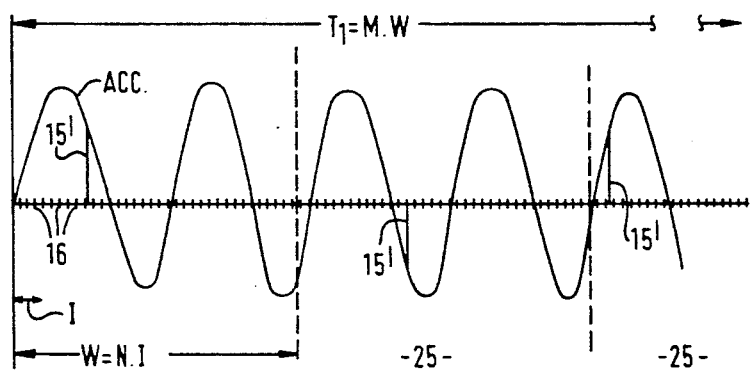
Figure 4:
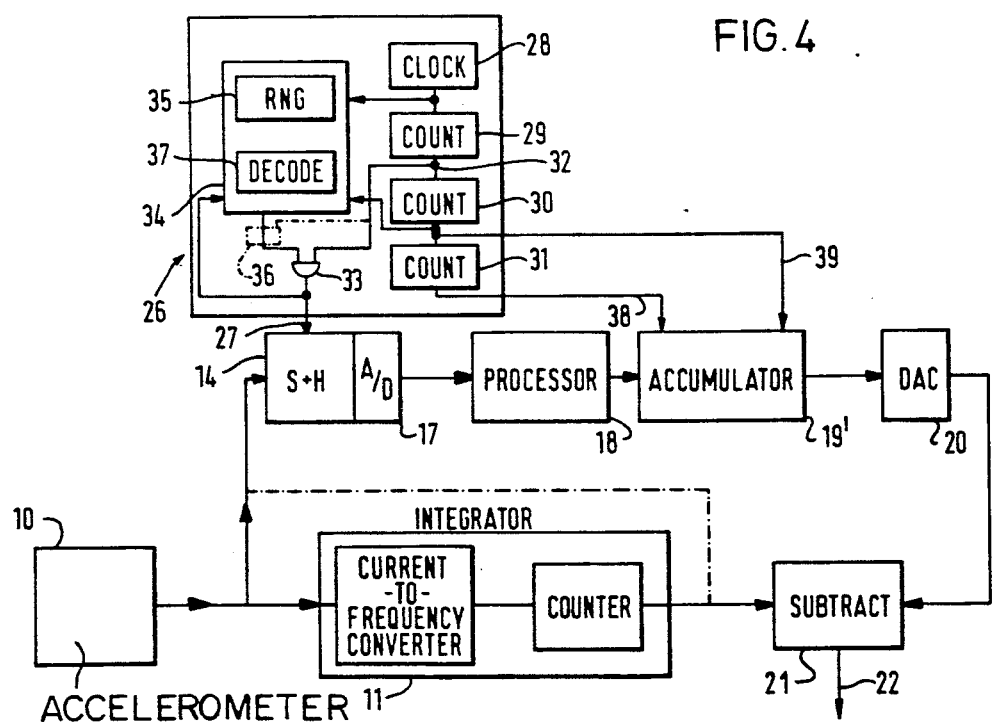

Examples of the present invention will now be described by way of example with reference to the accompanying drawings, in which:

FIG. 1(a) is a block circuit diagram of a known arrangement for correcting transfer function non-linearity in an inertial accelerometer integrated signal, FIG. 1(b) is a representation of accelerometer signal as a function of time when subjected to a constant inertial acceleration and sinusoidal vibrational acceleration and superimposed thereon the integral with respect to time of the accelerometer signal and sampling points at intervals defined in accordance with the Nyquist sampling theorem, FIG. 1(c) is a representation of the waveform of the integrated acceleration signal of FIG. 1(b) separated therefrom and showing also sampling intervals and the derivation therefrom of average acceleration samples, FIG. 2 is a representation of the acceleration signal of FIG. 1(b) for a defined integration period and illustrating the taking of fewer samples randomly in accordance with one embodiment of the present invention, FIG. 3 is graphical waveform similar to FIG. 2 but showing the taking of samples at random ones of fixed intervals within defined windows of the defined integration period, FIG. 4 is a circuit block diagram of signal processing means, based on the circuit of FIG. 1(a) correcting the integrated accelerometer signal in accordance with the present invention, FIG. 5(a) is a flow chart of steps in performing the present invention by means of software instructions in a programmed computer, and FIG. 5(b) and 5(c) are blocks of alternative ways of deriving samples for processing in the scheme of FIG. 5(a) in accordance with the present invention.

Referring to FIGS. 1(a) to 1(c) a source 10 of signal, the input signal, to be integrated is exemplified by a known form of inertial accelerometer, e.g. Ferranti FA2, which produces a signal in the form of a current passed thereby in a directional sense related to the direction of acceleration, and of magnitude that is nominally proportional to the magnitude of the acceleration. In practice the transfer function of the accelerometer, that is, its response to acceleration, is not linear, that is, is not one of direct proportionality, but is in the form of a polynomial having constant, acceleration and acceleration-squared terms as given by equation (1) above. Although the second order (acceleration-squared) response may be small in relation to the first order (acceleration) response, that is, have a coefficient $K_2 < < K_1$, operating conditions exist wherein its effect represents a source of real error.

In performing inertial navigation it is not unusual to require the measurement of velocity by integration of the accelerometer signal with respect to time and for the accelerometer to be undergoing very low levels of acceleration due to inertial motion whilst subjected to a considerable high frequency vibration, perhaps due to deliberate dither of an instrument cluster or craft vibration, which subjects the accelerometer to additional acceleration forces. In such vibration the peak acceleration forces reached may be such that despite a low second order response there is an error term introduced to the accelerometer signal that is significant in comparison with the first order inertial term when integrated to give the desired velocity function.

Referring to FIG. 1(b) this shows a waveform as a function of time of the output ACC. of accelerometer 10 when subject to both a steady inertial acceleration A and sinusoidal vibrational acceleration a, the second order terms being ignored for clarity. The waveform may be represented by the equation $$\text{ACC.} = A + a\sin wt. \tag{4}$$

Superimposed thereon is the integral with respect to time, that is, the velocity $$\text{VEL.} = A't - a'\cos wt + \text{const.}$$

which takes the form of a similar sinusoid offset in phase by 90° and oscillating about an abscissa which increases as a linear ramp function with time.

In the absence of any second order transfer function terms the integrated signal could be taken to give an instantaneous value, or be filtered of the high frequency components to give a mean value, of velocity.

It will be appreciated that with a vibrational acceleration that is a sinusoidal function, the second order transfer function term of the vibrational acceleration when integrated will have a constant, or d.c., effect as shown by equation (3) that would cause instantaneous errors as well as survive filtering of the higher frequency vibrations.

In accordance with equation (1) the output of accelerometer 10, equation (4), can be expressed as $$\text{ACC.} = (K_0 + K_1 A + K_2 A^2) + (K_0 + K_1 a\sin wt + K_2 a^2 \sin^2 wt) \tag{5}$$

Reorganising this in accordance with equation (3) gives $$\text{ACC.} = (K_0 + K_1 A + K_2 A^2) + (K_0 + K_1 a\sin wt + \tfrac{1}{2}K_2 a^2 - \tfrac{1}{2}K_2 a^2 \cos 2wt) \tag{6}$$

Apart from coefficient $K_0$ which is constant for the instrument and can be removed, the signal ACC. contains non-sinusoidal terms which when integrated increase as a function of time, namely: $K_1 A$, the inertial acceleration to be measured, $K_2 A^2$, the non-linearity error in the inertial acceleration, and $\tfrac{1}{2}K_2 a^2$, the non-linearity error in the vibrational acceleration.

The first of these is the desired measurement quantity and the last two are error components.

$K_2$ is normally much less than $K_1$ so the value of term $(K_2 A^2)$ is normally negligible compared with $K_1 A$.

Similarly where A is of the same order of magnitude as a or greater the value of term $(\tfrac{1}{2}K_2 a^2)$ may be negligible in relation to the value of term $K_1 A$. However, for low values of inertial acceleration A the value of $(\tfrac{1}{2}K_2 a^2)$ may become significant in relation to the value of $(K_1 A)$.

The signal delivered by accelerometer 10 is conveniently integrated directly by integration means 11 that in practice may take the form of a current-to-frequency converter 12 that charges and reset a capacitor, the number of resets for a particular current direction being counted at 13 for an integration period to give a measure of velocity.

It is known to remove the effect of the second order errors in the accelerometer signal by sampling the accelerometer signal by sampling means 14 at a rate in excess of the Nyquist sampling rate from the highest frequency of interest of the accelerometer signal, and preferably in practice at 2-6 times the highest frequency, as indicated at 15 in FIG. 1(b). For reasons which will become apparent this sampling rate and the intervals 16 at which samples are taken are herein conveniently called the high frequency rate of sampling and high frequency intervals of sampling respectively.

The samples 15 taken at intervals 16 are converted into digital form by analog to digital conversion means 17 and each sample passed to a processor 18 where it is subjected to an algorithmic process that derives a measure of the second order term of the input signal.

From equation (1), the acceleration output signal $\text{ACC.} = K_0 + K_1[\text{acceleration}] + K_2[\text{acceleration}]^2$.

For most purposes except integration the second and higher order terms can be ignored and $K^0$ readily eliminated, being a constant of the instrument, to give $$\text{ACC.} = K_0 + K_1[\text{acceleration}].$$

The signal $$\text{ACC.} \simeq K_1[\text{acceleration}]$$

may thus be squared to give $$\text{ACC.}^2 \simeq K_1^2[\text{acceleration}]^2, \text{ or} \tag{7}$$

$$[\text{acceleration}]^2 \simeq \text{ACC.}^2 / K_1^2 \tag{8}$$

so that the effect of the second order term in equation (1) can be approximated by $$K_2[\text{acceleration}]^2 \simeq \text{ACC.}^2 K_2 / K_1^2 \tag{9}$$

Where the acceleration is the aforementioned vibrational $a\sin wt$, and this is substituted in equation (9)

$$K_2 a^2 \sin^2 wt = \text{ACC.}^2 K_2 / K_1^2$$

or $$\tfrac{1}{2}K_2 a^2 - \tfrac{1}{2}K_2 a^2 \cos 2wt = \text{ACC.}^2 K_2 / K_1^2 \tag{10}$$

Thus by integration over the integration period the integral of the term $\tfrac{1}{2}K_2 a^2$ (and the term $\tfrac{1}{2}K_2 a^2 \cos 2wt$ for other than a complete number of vibrational cycles) can be evaluated.

A sample taken of the acceleration signal ACC. when squared and multiplied by the ratio $(K_2/K_1^2)$ of the coefficients represents the effect of the second order non-linearity term in the sample. Integration effected by multiplying this by the interval 16, which also represents the ratio of the integration period to the number of samples, and accumulation of similarly processed samples for the integration period gives an integrated version of the component of the accelerometer signal that is due effectively to the second order response term of the accelerometer.

The multiplication of each sample squared by the ratio ($K_1/K_2^2$) and the interval 16 may be performed more conveniently after accumulation of the squared samples in accumulator 19. The elements, 14, 17, 18 and 19 together comprise sampling and processing means.

The estimate is converted by digital-to-analog converter (DAC) 20 into a form corresponding to that of the integration means, such as a count, and both the output of integration means 11 and DAC 20 are fed to further processing means in the form of subtraction circuit 21 where the integrated signal is corrected by subtraction of the quantitative estimate of second order term 20 and a corrected value of velocity given at 22.

The above outlined procedure and apparatus is known and serves to illustrate how despite a simple and inherently accurate integration of the accelerometer signal considerable processing is deemed desirable to effect corrections due to second order components of the original signal caused by the non-linear transfer function and which processing, if done digitally as is most practicable, utilises considerable processing and storage overheads, largely because of the number of samples dictated by the sampling accepted as part of digital processing.

FIG. 1(c) shows the integrated signal VEL of FIG. 1(b) separately and also illustrates how this signal may itself be sampled and an adjacent pair of samples, such as 23 and 24, separated by a short time interval, conveniently one high frequency interval 16, employed to derive a rate of change of velocity, that is, an average value of acceleration, for the high frequency sampling interval 16 that could be employed in a slightly modified algorithmic process in FIG. 1(a), and in practice the use of the integrated signal in other computation makes this a particularly suitable source of correction signals.

In accordance with the present invention processing methods by which the effect of the second order term of the accelerometer signal on the integrated accelerometer signal is quantified is illustrated by the waveform of FIGS. 2 and 3.

Referring to FIG. 2, which shows the signal ACC., the method of processing in accordance with the present invention comprises defining the aforementioned integration period as $T_1$, which for a particular frequency of accelerometer oscillation will contain a known number of cycles of the waveform, and sampling the signal at randomly or pseudorandomly related times so as to take in the integration period a plurality of samples 15' fewer in number than if the signal were sampled at or above the Nyquist rate that is depicted in FIG. 1(b).

The samples are processed substantially in accordance with the conventional algorithm outlined hereinbefore (for deriving a function of the second order component of the signal) by squaring each effective sample of signal ACC., accumulating it with others of samples taken in the integration period $T_1$ and multiplying by a factor that gives the equivalent of the second order coefficient and the ratio of the integration period to the number of samples taken in it. This ratio is an approximation of the average time interval over which each sample extends to the next sample. The input signal ACC. is continuous and the accumulated output is continuously updated, being formed from those samples taken in the preceding interval $T_1$. Each sample when processed by the algorithm provides an estimate of the second order acceleration-squared effect on the inertial acceleration signal but one which is clearly not accurate due to the high frequency variations with time and the integral of the samples, the contents of the accumulator, may be thought of as suffering from 'noise'. By taking several samples in effectively random manner such that there is no correlation between the sampling points on the waveform cycle then over a period of several cycles the processed results of the samples accumulate in sufficiently close agreement with sampling at or above a high Nyquist rate for possibly fewer cycles. However, as an essential feature is that the input signal is subject to integration over many cycles the additional time required to approach the accuracy of sampling at or above the Nyquist rate is not disadvantageous whereas the savings in sample processing are advantageous.

If the so-called low frequency of the inertial acceleration is sufficiently low, for example, zero frequency, then the integration period may be made as long as desired, and with the random sampling eventually for practical purposes equating to sampling above the Nyquist rate.

On the other hand the repetition rate of the high frequency intervals may be defined in accordance with accepted practice far in excess of the Nyquist rate and the repetition rate of the window intervals should also be less than the Nyquist sampling rate for the highest frequency of interest.

The important difference is that the sampling is taking place at a lesser rate in real time and in any period of time fewer samples are processed, thereby relaxing the demands of processing on the digital computer.

It will be appreciated that in general the integration period will have some limits imposed upon it, such as by variations in the inertial acceleration rate or a desire to restrict the number of samples processed in any shorter interval but it has been found that with a high frequency signal of the order of 400 Hz taking fewer than 5% of the samples required by the 3×Nyquist rate norm with an integration period of several seconds provides an adequately quantified estimate of the input singal error effects on the integrated signal.

The random taking of samples may be effected having regard to the 'clocked' operation of digital circuitry to which the samples are input by defining the integration period $T_1$ as a plurality of what have herein conveniently been called high frequency intervals 16 which occur at or above the Nyquist sampling rate, such as for samples 15 in FIG. 1(b), and selecting by a random or pseudorandom selection process intervals at which samples taken thereat are subjected to the algorithmic process. The selection may result in the actual taking of a sample at that interval when otherwise a sample would not be taken or in the passing of the selected samples, which are taken at each interval, for processing.

The method of the invention is implemented with the intent of reducing the demands on computing time whilst receiving sufficient number of samples to make an effective quantitive estimate. To assist in computer management it is considered helpful, if not essential, for the samples taken to be well spread throughout the integration period as illustrated in FIG. 2. However, it will be appreciated that if they are taken truely randomly it is difficult to control both the number of samples taken in the integration period and their separation so that to receive adequate information by processing an appropriate number of samples could depend upon processing samples taken closely together and not relieving instantaneous demands on the computing arrangement.

Further to the above described method, and as illustrated by the waveform ACC. of FIG. 3, the integration period $T_1$ is divided into a plurality of high frequency intervals 16, as mentioned above, of duration I which may equal n clock pulses of a higher frequency clock occurring at at least the Nyquist sampling of the highest frequency of interest of the input signal and further defining each group of N successive intervals I as a sampling window interval 25 of duration $W=N.I$, the successive sampling window intervals having a repetition rate greater than the Nyquist sampling rate for the changes in inertial acceleration, a condition easily met with a zero or near-zero frequency component, so that M window intervals define the integration period $T_1$.

Sampling is controlled so that a sample 15" of the input signal is taken at at least one of the high frequency intervals in each window interval, the high frequency interval at which a sample is taken being selected by a random or pseudorandom process within the constraints of the number of intervals in, or duration of, each window interval. This has the effect of samples being taken in synchronism with subsequent digital processing and spread throughout the integration period.

It will be appreciated that more than one sample may be taken in each window interval but not so many as to depart from the philosophy of the invention in terms of the number of samples taken for processing.

Similarly it will be appreciated that one or more samples may be taken truely randomly in each window interval.

The methods of the present invention described above may be implemented by suitable combination of items of hardware, and software where appropriate, that are conventional per se and FIG. 4 shows in block diagram form apparatus suitable for implementing the operation described in relation to FIG. 3 and based upon that described above with reference to FIG. 1(a), with which common elements have common reference numbers.

Sampling and processing means 14', 17, 18 and 19' has sampling means 14 controlled by control means shown generally at 26 which provides at random or pseudorandom intervals control signals to an input 27 of the sampling means 14'.

To implement the method described in relation to FIG. 3 the control means 26 includes a master clock 28 (although this may be provided by or associated with the processor 18) a first counter 29 which has a counting limit settable to define with the clock rate the high frequency intervals 16 as I clock pulses, a second counter 30 which has a counting limit settable to define with the high frequency intervals 16 rate the sampling window intervals 25 as $W=N.I$ and an optional third counter 31 which has a counting limit settable to define as an integral number M of sampling window intervals W the integration time $T_1$.

The output 32 of counter 29, that is, at the high frequency intervals, is fed by way of gate 33 to the sampling means 14 whereby when the gate is opened a sample is taken and/or applied to the analog to digital converter and processor at the appropriate interval 16. Gate 33 is normally closed and is opened by a control signal at the other input from a signal generator 34 which includes a random or pseudorandom generator, such as a pseudorandom number generator 35 and decoding means 37 for turning appropriate numbers into a signal occurring at a random or pseudorandom interval. The signal generator 34 is organised such that it produces an output at some time within the duration of each sampling window, possibly by being fed with the same setting as defines the window count, and is reset for the beginning of each sampling window by an output from counter 30.

Thus once at least in each sampling window the gate 33 is opened at a random one of the high frequency sampling intervals 16 occurring therein and the signal is sampled.

The output of counter 31, if employed, may be fed to accumulator 19' as shown at 38 to define the number of windows M and also, if one sample is taken per window interval, the number of samples which are considered to represent the integration period.

The accumulator receives and stores this number of processed samples, each new processed sample overwriting the oldest stored one and providing a constantly updated sum of the stored processed samples for the digital-to-analog converter 20.

If only one sample is processed and the result provided per sampling window interval the accumulator provides an output based upon the similar number of sampling window intervals, even though this output is updated at an indeterminate time within the window depending upon when the sample is taken.

If desired the accumulator 19 may be reset by an output of second counter 30 on line 39 at the start of each sampling window to eliminate the processed sample or samples from the oldest of a preset number of sample windows as determined by line 38, thereby defining an integration period by number of sampling windows rather than number of samples. This may be employed where sample taking is not limited to one sample per sampling window interval, or at least a fixed number of samples per sampling window interval.

The latter situation pertains with a modification (not shown) of the control means 34 wherein the signal generator 35 comprises a truely random signal generator that is not subject to a reset control for each sampling window as described above and/or which produces control signals for the sample and hold means at other than integral numbers of high frequency intervals 16 through gating means 33. Such random signal generator may employ white noise generator or a radioactive source whose decay rate is chosen to provide over the integration period a high likelihood of an acceptable number of 'counts' that can be used by the decoder 37 to provide the control signal.

It will be understood that the circuit arrangement of FIG. 4 is open to further variation in detail in the construction of the control means 26, the relationship between the accumulator and other components such as the processor 18 and the definition of its integration period as well as the use to which the output of the accumulator is put.

The number generator 35 may actively compute new numbers continuously from a seed number or a noise signal using computational overheads or comprise a read only memory in which are stored a large number of pre-computed random numbers, being addressed sequentially with low demands on computational circuits in operation.

One particular modification may be the sampling of the integrated signal from the output of integrator 11 to derive an effective sample of the input signal. As indicated by FIG. 1(c) the signal requires sampling at pairs of adjacent sampling intervals in order to determine the rate of change and to this end a flip-flop 36 is included in the output of signal generator 34 which when triggered by an output thereof holds the gate 33 open for two high frequency intervals I and causes two samples to be taken and/or passed for processing.

It will be appreciated that the processor 18 for performing the algorithmic process on the samples and the accumulator 19 may in practice be provided by a programmed computer which processes in digital form samples taken for other purposes by means of software control.

As indicated hereinbefore such configuration is often employed to sample the integrated signal from 11 and perform the correction, as well as other processes, on these samples of the integrated signal.

It will be appreciated that the above described processing may be implemented by software steps within a computer scheme to minimize the number of operations employed in actually performing the correction algorithm.

The procedure may be based upon that described in relation to FIG. 4, by taking samples of the accelerometer signal at the randomly or pseudorandomly defined intervals, by taking samples of integration signals in pairs at adjacent high frequency intervals 16, one of which pair is randomly or pseudorandomly defined as above, and deriving an average acceleration sample value for the high frequency interval 16, or by accepting that samples are taken at each high frequency interval for other purposes or by simple existing control but only processing those of intervals defined in accordance with the above random or pseudorandom designation.

FIG. 5(a) shows a flow chart of the steps of the above described correction operation suitable for incorporating into programmed operation of a computer.

The sequence starts by defining in relation to the clock frequency of the processor the high frequency intervals 16 as I=n clock pulses, the window intervals 25 as W=N.I and the integration period $T_1$ as M.W.

The clock pulses from clock 40 are counted at 41 and compared at 42 with the number n to derive the high frequency intervals I which are themselves counted at 43. The count of high frequency intervals I is compared with the number N at 44. If it is less than N it is compared at 45 with a number R generated by pseudorandom number generation algorithms 46 that provide a number R between 1 and N inclusive.

When the number of high frequency generated corresponds to R the generator 46 is stopped from providing an output to 45 or reset to begin a new generation when restarted. The number R defines a high frequency sampling interval at which a sample is taken 47 for the algorithmic process, that is, the derivation of the second order component of the accelerometer signal in this instance, at 48.

At the end of the sampling window, that is after N high frequency intervals I the comparison at 44 is positive and this both resets counter 43 for the next window and restarts generator 46 to provide a new value of R for the next window.

Each sample processed at 48 is applied to accumulator 49 which, controlled in accordance with the number M of windows, and therefore samples, in integration period $T_1$, accumulates the most recent M processed samples in order to give a velocity correction value at 50.

It will be seen from FIG. 5(b) that, if appropriate and samples are taken at the high frequency rate for other purposes, the action at 47 may comprise simple selection 47' of the samples taken at the corresponding interval.

Alternatively, as illustrated at 47" in FIG. 5(c) the action at 47" may comprise taking or selecting a taken sample of the integrated signal at the interval $R=I_i$ followed by a sample at the next interval $I_{i+1}$ and deriving from the difference between them and the duration of the high frequency interval $(I_i-I_{i+1})$ the average value of acceleration for that interval.

The above considered accelerometer signal, the error present therein that affects the integrated signal and the steps of correcting for it are to be considered as examples only not limiting as to form of signal and how a correction is derived by algorithmic process for corrective application to the integrated signal.

As also outlined hereinabove a signal may derive from an output of each of inertial accelerometers disposed with their three sensitive axes mutually orthogonal. Furthermore one or more of these accelerometers notwithstanding any non-linear response as described above may be subjected to vibration in a direction or directions orthogonal to its nominally sensitive axis as a consequence of which so-called vibropendulosity and sculling effects result in an erroneous component of the integrated signal.

It is known to correct for these effects by sampling the signals of the accelerometers sensitive in those orthogonal directions and gyroscopes, if rotation about an axis is involved, and perform algorithmic processing that involves deriving the cross product of these signal samples before accumulating the process results for the integration period and then correcting the integrated signal.

It will be appreciated that the present invention is applicable to such correction also, the only difference apart from performing a different algorithmic process on the samples is the taking of samples at the same time from any accelerometer or gyro signal or integrated signal which is to be used in combination with that of another.

Finally it is reiterated that although the above description has concentrated on accelerometer signals which are integrated with respect to obtain velocity this invention is applicable to any signal representation that is integrated and to which integrated signal a correction is made by sampling a signal or signals for the integration period purely to perform operations on the samples which are then also integrated for correction of the integrated signal.

I claim:

1. Apparatus for processing an analog input signal by integrating the analog input signal with respect to time thereof for an integration period and correcting errors in the integrated signal due to errors in the analog input signal comprising control means (26) for defining the integration period and generating a plurality of control signals, the number of control signals generated being smaller than that required by the Nyquist sampling theorem for a predetermined highest frequency component of the input signal, a sampling circuit for sampling the input signal, a gate for applying the control signals to the sampling means such that said sampling circuit derives sampled signals in response to said control signals that bear a functional relationship with errors in the input signal, means for processing the sampled signals and subjecting the sampled signals to an algorithmic process representative of said functional relationship to quantify the error in the input signal represented by the sampled signals, means for integrating the processed sample results, means for applying the control signals to the means for integrating the processed sample results to quantity the effect of errors on the integrated analog input signal and means for modifying the integrated input signal in accordance with the quantified effect to correct errors in the integrated input signal.

2. Apparatus as claimed in claim 1 in which the control means is operable to define the integration period as a succession of sampling window intervals at a repetition rate greater than a Nyquist sampling rate for the lowest frequency component of interest of the sampled signal and said control signals are generated for each window interval.

3. Apparatus as claimed in claim 1 in which the control means is operable to define a plurality of high frequency intervals occurring at least the Nyquist sampling rate for the highest frequencies of interest of the signal to be sampled and randomly or pseudorandomly select ones of said high frequency intervals at which to produce said control signals.

4. Apparatus as claimed in claim 3 in which the control means is operable to define the integration period and to select a predetermined number of said high frequency intervals in the integration period.

5. Apparatus as claimed in claim 3 in which the control means is operable to cause the sampling means to produce said signal samples at the high frequency rate and apply only the samples for processing that coincide with the control signals.

6. Apparatus as claimed in claim 3 in which the control means includes a random or pseudorandom signal generator and means to condition the generator to select said high frequency intervals at which control signals are produced.

7. Apparatus as claimed in claim 3 in which arranged to sample and process the input signal for said algorithmic process and in which the sampling and processing means is responsive to the control means to take sequential samples of the integrated signal as pairs separated by one of said high frequency intervals and derive the rate of change in sample value between each sample of the pair as representing a sample of the input signal within said short time interval.

8. Apparatus as claimed in claim 1 arranged to sample and process the input signal for said algorithmic process and in which the sampling and processing means are responsive to the control means to take sequential samples of the integrated signal as pairs separated by a short time interval and derive the rate of change in sample value between each sample of the pair as representing a sample of the input signal within said short time interval.

9. Apparatus as claimed in claim 1 arranged to sample and process more than one signal for said algorithmic process and in which the control means is arranged to process samples taken simultaneously from each of the signals.

10. Apparatus as claimed in claim 1 in which the control means is operable to define the integration period as a succession of window intervals at a repetition rate greater than the Nyquist sampling rate for the lowest frequency component of interest of the sampled signal and said control signals are generated for each window interval and in which the control means is operable to define a plurality of high frequency intervals occurring at least the Nyquist sampling rate for the highest frequencies of interest of the signal to be sampled and randomly or pseudorandomly select ones of said high frequency intervals at which to produce said control signals.

11. Apparatus as claimed in claim 10 in which arranged to sample and process the input signal for said algorithmic process and in which the sampling and processing means is responsive to the control means to take samples of the integrated signal as pairs separated by a short time interval and derive the rate of change in sample value between each sample of the pair as representing a sample of the input signal within said short time interval.

12. Apparatus as set forth in claim 1 wherein said analog input signal is the output of an accelerometer.

13. Apparatus as set forth in claim 1 further including means for integrating the analog input signal and applying the integrated input signal to the means for modifying the integrated input signal.

14. Apparatus as set forth in claim 1 wherein the means for modifying the integrated analog input signal is a subtractor having a first input, a second input and an output, means connecting the integrated input signal to the first input, means connecting the integrated processed sample results to the second input, the output being a signal corresponding to the integrated input signal with errors corrected in accordance with the quantified effect derived by said means for integrating the processed sample results.

* * * * *